(12) United States Patent
Bergerhoff et al.

(10) Patent No.: US 6,481,781 B2
(45) Date of Patent: Nov. 19, 2002

(54) HARDTOP VEHICLE ROOF

(75) Inventors: Harald Bergerhoff, Hamburg (DE); Christian Holst, Hamburg (DE)

(73) Assignee: CTS FahrzeugDachsysteme GmbH, Hamburg (DE)

( * ) Notice: Subject to any disclaimer, the term of this patent is extended or adjusted under 35 U.S.C. 154(b) by 0 days.

(21) Appl. No.: 09/992,693

(22) Filed: Nov. 21, 2001

(65) Prior Publication Data

US 2002/0060471 A1 May 23, 2002

(30) Foreign Application Priority Data

Nov. 21, 2000 (DE) .......................... 100 57 872

(51) Int. Cl.⁷ ................................ B60J 7/00
(52) U.S. Cl. ................ 296/107.17; 296/107.01; 296/108; 296/107.16; 296/107.18; 296/107.19; 296/107.2
(58) Field of Search ............. 296/100.01, 100.02, 296/100.03, 100.17, 107.01, 108, 107.16, 107.17, 107.18, 107.19, 107.2

(56) References Cited

U.S. PATENT DOCUMENTS

| 4,854,634 A | * | 8/1989 | Shiraishi et al. ............ 296/108 |
|---|---|---|---|
| 5,265,930 A | * | 11/1993 | Klein et al. ............ 296/107.17 |
| 5,490,709 A | * | 2/1996 | Rahn ............ 296/108 |
| 5,520,432 A | * | 5/1996 | Gmeiner et al. ............ 296/108 |
| 5,584,522 A | * | 12/1996 | Kerner et al. ............ 296/108 |
| 5,593,202 A | * | 1/1997 | Corder et al. ............ 296/108 |
| 5,769,483 A | * | 6/1998 | Danzl et al. ............ 296/108 |
| 5,785,375 A | * | 7/1998 | Alexander et al. ............ 296/108 |
| 5,833,300 A | * | 11/1998 | Russke ............ 296/108 |
| 5,979,970 A | * | 11/1999 | Rothe et al. ............ 296/107.17 |
| 5,988,729 A | * | 11/1999 | Klein ............ 296/108 |
| 6,312,042 B1 | * | 11/2001 | Halbweiss et al. ............ 296/108 |

FOREIGN PATENT DOCUMENTS

| DE | 39 03 358 | 8/1990 |
|---|---|---|
| DE | 196 42 154 | 4/1998 |
| DE | 199 30 616 | 9/2000 |
| EP | 0 990 545 | 4/2000 |

* cited by examiner

*Primary Examiner*—D. Glenn Dayoan
*Assistant Examiner*—Lori L Coletta
(74) *Attorney, Agent, or Firm*—Klaus J. Bach

(57) ABSTRACT

In a hard top vehicle roof which is movable between a closed position, in which it covers the interior of a vehicle, and a storage position, in which it is contained in a vehicle storage space, the vehicle roof includes a rear roof part, which is pivotally mounted on the vehicle body and a front roof part, which is mounted on the rear roof part so as to be movable below and in parallel relationship to the rear roof part for movement therewith into the storage space.

10 Claims, 3 Drawing Sheets

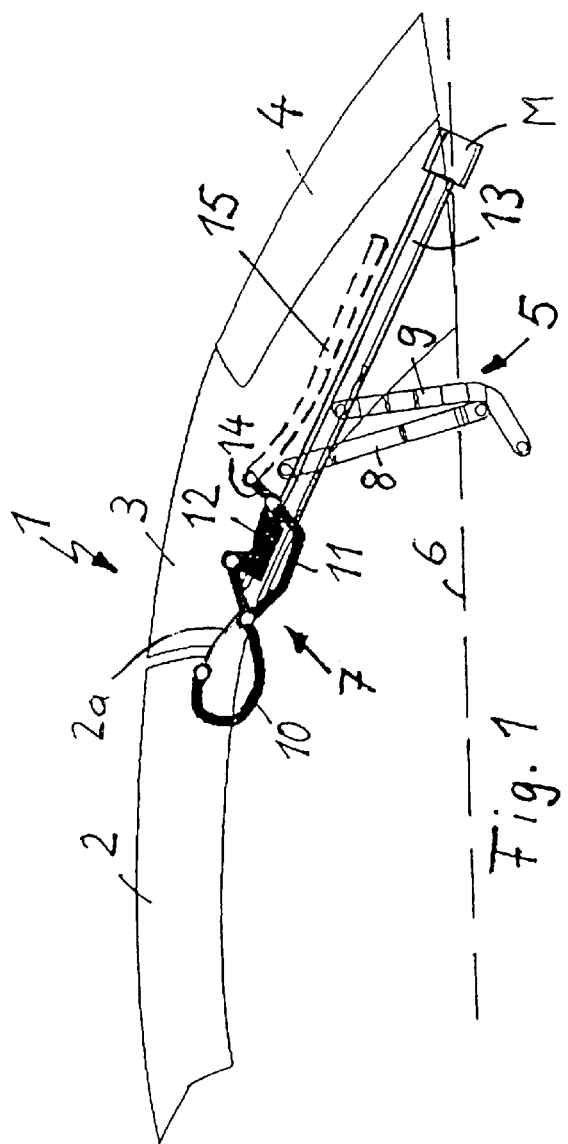

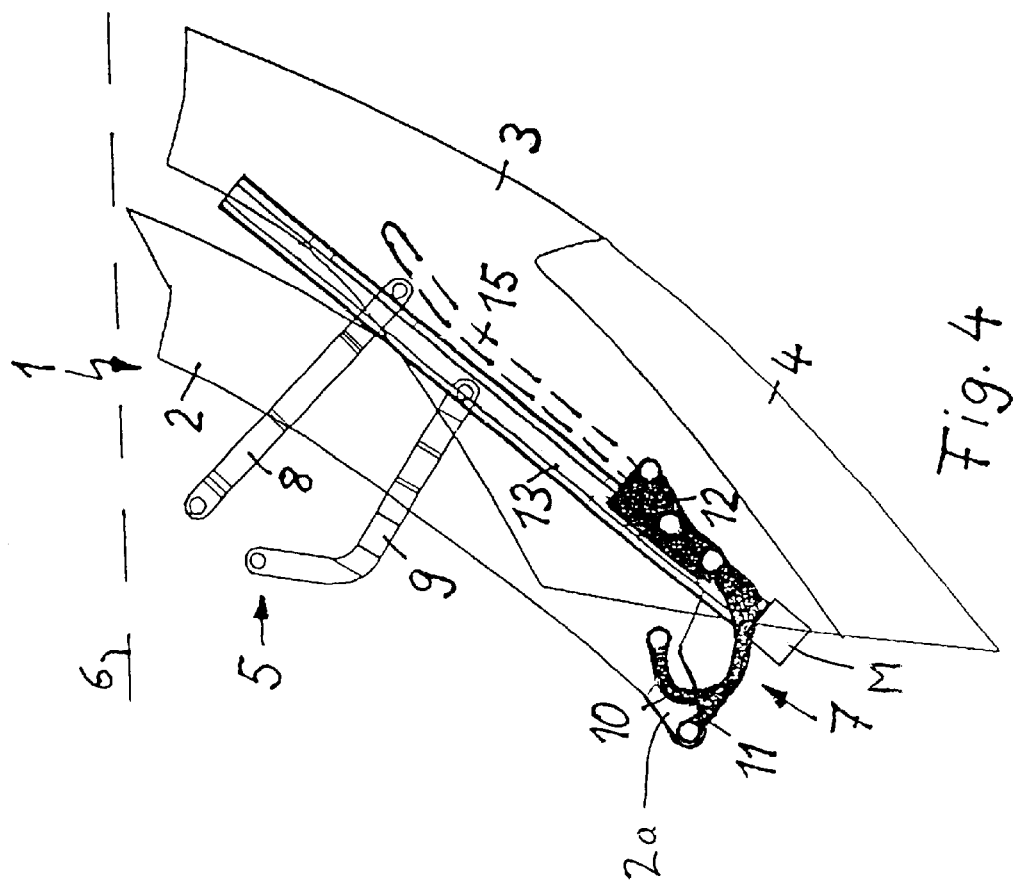
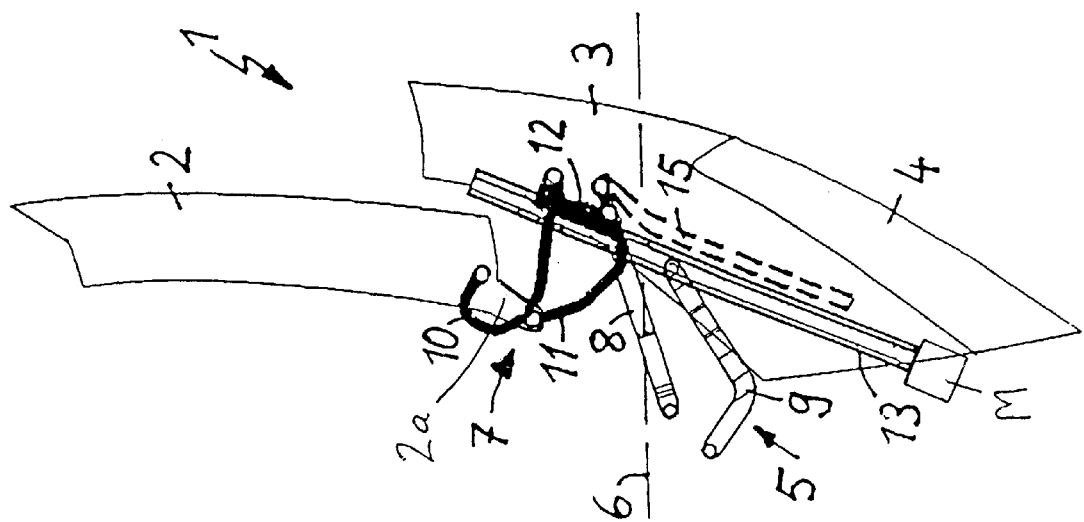

HARDTOP VEHICLE ROOF

BACKGROUND OF THE INVENTION

The invention relates to a hardtop vehicle roof which is movable between a closed position, in which it covers the interior vehicle space, and a storage position, in which the interior vehicle space is open, and which includes a front roof part and a rear roof part, with a kinematic operating mechanism disposed between the front and rear roof parts for controlling relative motion between the roof parts upon opening and closing the roof.

DE 199 30 616 C1 discloses a vehicle roof which is movable between a closed position, in which the vehicle interior is covered, and a storage position, in which the vehicle interior is open, and which includes a front roof part and a rear roof part. The front roof part is coupled by a movement control mechanism to the rear roof part, which is connected to the vehicle body by another movement control mechanism. Upon transfer of the vehicle roof from the closed position to the storage position, the whole vehicle roof is first pivoted backward along a vehicle-mounted guide track, which is part of the movement control mechanism between the rear roof part and the vehicle body while the relative position between the front and the rear roof parts remains unchanged. Subsequently, the front roof part is displaced, by means of a two link joint, out of the common roof plane downwardly with respect to the rear roof part and then moved laterally below the rear roof part. In a final movement phase, the two roof parts, which are now arranged in parallel, are lowered into a storage compartment disposed behind the passenger compartment until the final storage position is reached.

For executing the relative movement between the front and rear roof parts, an actuating member is required which engages the two-link joint and which provides for the pivot movement of the links of the joint as well as the lateral displacement of the roof along the guide track in a coordinated manner. During the displacement of the front roof part out of the common roof plane, a lateral displacement of the two-link joint is first avoided and, during the subsequent lateral movement along the guide track, an undesired pivot movement of the two- link joint is prevented. The coordinated subsequent movements, that is, the pivot movement and the lateral displacement requires the locking of the particular degree of freedom of movement which is not needed for a particular movement.

It is the object of the present invention to provide a hardtop vehicle roof which has a drive mechanism which is simple in design and which includes a precise and reliable transfer mechanism for transferring the vehicle roof between the closed and the storage positions thereof.

SUMMARY OF THE INVENTION

In a hard top vehicle roof which is movable between a closed position, in which it covers the interior of a vehicle, and a storage position, in which it is contained in a vehicle storage space, the vehicle roof includes a rear roof part which is pivotally mounted on the vehicle body and a front roof part which is mounted on the rear roof part so as to be movable below and in parallel relationship to the rear roof part for movement therewith into the storage compartment.

With the hardtop vehicle roof according to the invention, the relative kinematic mechanism between the front and the rear roof parts includes two guide tracks which are arranged each on the rear roof part and in which a two-link joint, by way of which the relative movement of the front roof part with respect to the rear roof part is controlled, is guided in each movement phase in a predetermined manner, that is, without any uncontrolled degree of freedom. The second guide track reduces the freedom of movement of the two-link joint by a degree freedom so that the front roof part must follow a single predetermined path of movement relative to the rear roof part. The only available degree of movement of the relative kinematics is controlled by an operating member, by which the operating force for the movement of the front roof part relative to the rear roof part is applied.

The path of movement followed by the front roof part relative to the rear roof part is determined by t he shape of the additional guide track in which one of the two links of the two-link joint is guided. With the additional kinematic guide by way of the second guide track, the operating member can be simple since it is now sufficient to provide a drive member for laterally moving the roof part along the first guide track, which is preferably a straight track. The pivot movement of the front roof part is provided for by the curved path of the second guide track in a predetermined manner.

The second guide track, which is mounted to the rear roof part includes, in its area adjacent the front roof part, a section which is curved upwardly in a longitudinal plane of the vehicle and becomes straight toward its end opposite the front roof part. The straight section extends preferably parallel to the first guide track. During the transfer of the vehicle roof from the closed position to t he storage position, the movement of the front roof part is, at the beginning of the relative motion between the front and rear roof parts, first controlled by the curved track section whereby, within a short travel distance, a large pivot movement of the front roof part is executed which leads, in an advantageous manner, to a lowering of the front roof part out of the common roof plane into a parallel position below the rear roof part. Then the straight section of the guide track is entered so that, after the displacement of the front part into a lower parallel plane, the front part moves laterally below the rear part into a parallel end position below the rear roof part.

Preferably, the actuating kinematics which moves the rear roof part between its closed and its storage position, is in the form of a two-link joint, which is supported by the vehicle body and provides for a pivot movement of the rear roof part between the closed and storage positions thereof. With the use of such a two-link joint for the movement of the rear roof part, no additional guide tracks to be mounted on the vehicle body are needed whereby some space is gained. The two-link joint between the vehicle body and the rear roof part occupies comparatively little space in the closed position as well as in the storage position of the roof. It is noted that, of course, the same operating mechanisms are provided at both sides of the vehicle roof.

An embodiment of the invention will be described below in detail on the basis of the accompanying drawings.

BRIEF DESCRIPTION OF THE DRAWINGS

FIG. 1 shows a hard top vehicle roof with a front roof part, a rear roof part including an operating mechanism, the roof being shown in the closed position, FIG. 2 shows the hard top vehicle roof in an upwardly pivoted intermediate position between the closed and the storage positions, wherein the front part of the roof is still in its original position with respect to the rear part, FIG. 3 shows the hard top vehicle roof in another intermediate position, in which the front part of the roof is lowered with respect to the rear part, FIG. 4 shows the hardtop vehicle roof in a storage position, in which the front and the rear roof parts are disposed parallel adjacent each other.

DESCRIPTION OF A PARTICULAR EMBODIMENT

Figure 5:
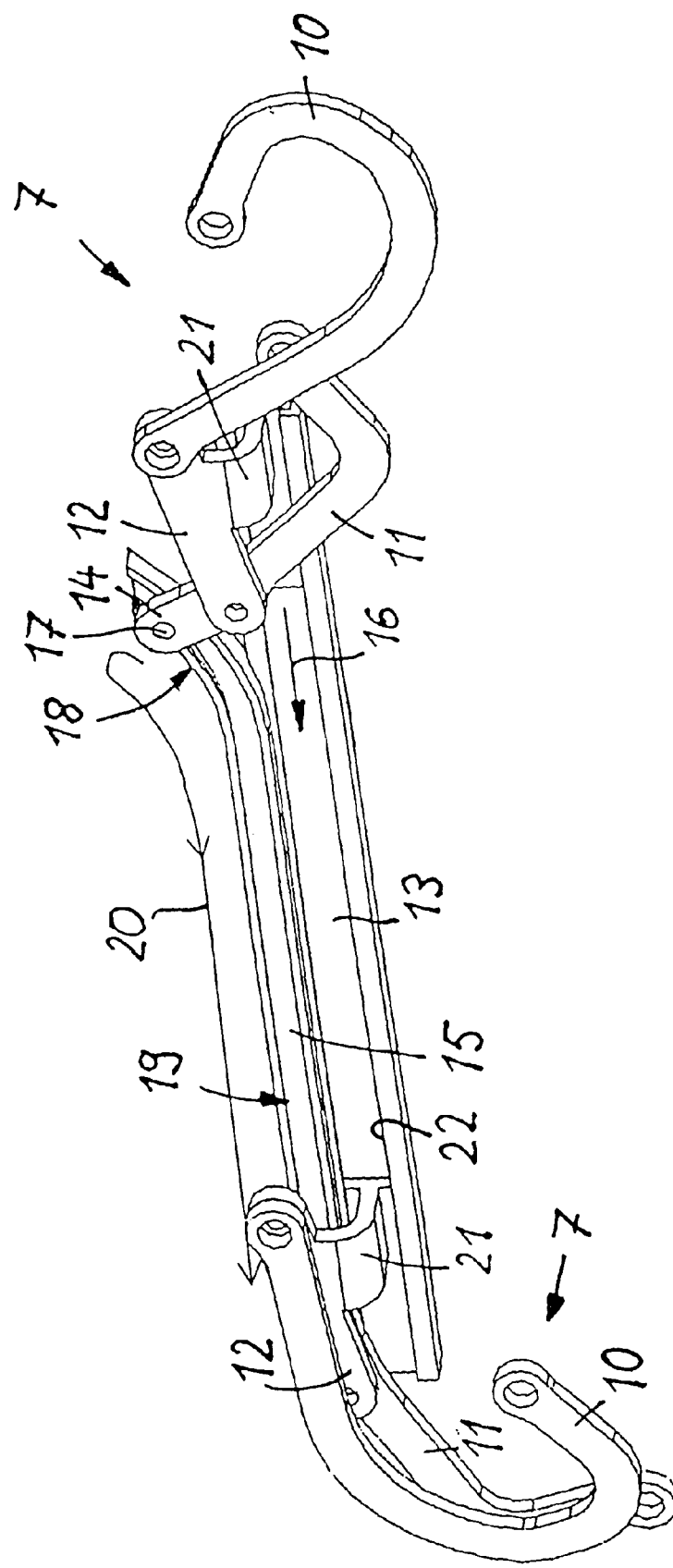
FIG. 5 shows the mechanism or kinematics interconnecting the front and rear roof parts in an enlarged representation for a closed position (at the left end of the track) and in a storage position (at the right end of the track).

Identical components are designated in the various figures by the same reference numerals.

The hardtop vehicle roof 1 as shown in FIG. 1 comprises a front roof part 2 and an adjacent rear roof part 3 into which a rear window panel 4 is integrated. In the closed position of the vehicle roof 1, as shown in FIG. 1, the front roof part 2 and the rear roof part 3 are disposed essentially in a common roof plane. The rear roof part 3 is connected to the vehicle body 6 by a kinematic operating mechanism including a two-link joint 5. The front roof part 2 has a projection 2a by way of which it is exclusively coupled to the rear roof part 3 by a kinematic relative movement mechanism, which includes a double link joint 7. For the transfer of the vehicle roof 1 between the closed and the storage positions both, the kinematic operating mechanism as well as the kinematic movement mechanism including the double link joint 7, must be actuated.

The kinematic operation mechanism 5 by which the rear roof part 3 is mounted to the vehicle body 6 comprises a two-link joint with links 8 and 9 which are pivotally supported at one of their ends by the vehicle body 6, while their opposite ends are connected to the rear vehicle roof part 3. The two-link joint of the kinematic operating mechanism 5 is actuated by a drive member or, respectively, a roof drive, which is not shown herein.

The kinematic roof operating mechanisms includes, in addition to the kinematic operating mechanism 5, by which the rear roof part 3 is mounted to the vehicle body 6, a relative movement mechanism, by which the front roof part 2 is mounted to the rear roof part 3 and which includes the double link joint 7. The double link joint 7 comprises two levers 10 and 11, which are pivotally connected at one end to the projection 2a of the front roof part 2 and with their other ends to a slide member 12, which is supported by the rear roof part 3 and which is movable laterally relative to the rear roof part 3. To movably support the slide member 12, the rear roof part 3 includes a first guide track 13, which is shown in the embodiment as a straight track and which is firmly connected to the rear roof part 3. The slide member 12 is movably supported by the guide track 13.

The lever 11 includes at its end adjacent the rear roof part 3, a lever section 14, which extends beyond the slide member 12 and which is provided at its end with a pivot bolt that extends into a second guide track 15, which is also mounted to the rear roof part 3 and in which the pivot bolt is guided. The second guide track 15 is disposed essentially parallel to, and above, the first guide track 13, but, at its end adjacent the front roof part 2, it has an upwardly curved section where it extends away from the guide track 13 as shown in detail in FIG. 5.

The transfer of the vehicle roof 1 from the closed position as shown in FIG. 1 to the storage position as shown in FIG. 4 occurs in different movement phases. For opening the vehicle roof 1, in a first movement phase as shown in FIG. 2, the kinematic operating mechanism 5 between the rear roof part 3 and the vehicle body 6 is actuated whereby the whole vehicle roof 1 is pivoted upwardly into an almost vertical position while the relative position between the front roof part 2 and the rear roof part 3 is maintained. In this first movement phase, the double-link joint 7 of the kinematic operating mechanism between the front roof part 2 and the rear roof part remains in its position relative to the rear roof part 3, which, in the position as shown in FIG. 2, is already partially inserted into a storage space below the top contour of the vehicle body 6.

In FIG. 3, a subsequent movement phase is shown wherein the rear roof part 3 is still further inserted into the storage space within the vehicle body 6. At the same time, also the double-link joint 7 of the relative kinematic operating mechanism between the front roof part 2 and the rear roof part 3 has been actuated. In the position as shown in FIG. 3, the front roof part 2 is pivoted out of the common plane with the rear roof part 3 into a position in which the front roof part 2 partially overlaps the rear roof part 3. The pivot movement is caused by an operation of the double-link joint 7, by which the front roof part 2 is first displaced parallel to the common roof plane. This first movement phase of the relative kinematic operating mechanism is performed while the slide member 12 is moved only a small distance in the guide track 13. When the front roof part 2 is displaced parallel to the common roof plane so that it can be moved parallel to the inside of the rear roof part 3 without colliding therewith, the slide member 12 on which the double-link joint 7 is supported is moved laterally along the guide track 13 until the front roof part 2 and the rear roof part 3 are in the relative positions as shown in FIG. 4. In this position, the front roof part 2 and the rear roof part 3 are disposed adjacent each other in parallel planes and the whole vehicle roof has a minimum length.

The slide member 12 is moved to the opposite end position in the track 13 continuously while the roof is moved into its final storage position in the vehicle body as shown in FIG. 4, wherein the front roof part and the rear roof part are disposed adjacent each other in an essentially vertical position in the storage compartment. During the last movement phase between the intermediate position shown in FIG. 3 and the storage position shown in FIG. 4, the double-link joint 7 of the kinematic operating mechanism is moved with the slide member 12 from a position above the two link joint 5 to an end position below the two link joint 5.

FIG. 5 shows the double link joint 7 in a closed roof position at the right end of the figure and in the storage position at the left end of the figure. During movement of the slide member 12 in the direction of the arrow 16 from the closed to the storage position, the double link joint 7 of the relative operating mechanism is first pivoted by a large angle because the pivot bolt 17 controlling the link section 14 of the link 11 is guided in the second guide track 15, specifically in the upwardly curved end section 18 of the track 15. The upwardly curved end section 18 turns into a straight section 19. During movement of the guide bolt 17 in the straight section 19, the pivot position of the double-link joint 7 and of the front roof part 2 remain unchanged until the roof is in the final storage position when the slide member 12 is in the left end position as shown in FIG. 5 with the links 10 and 11 in the pivot position shown.

Reference numeral 20 indicates the path of movement of the guide bolt 17 in the second guide track 15. When the slide member 12 with the double link joint 7 is first moved out of the closed position of the vehicle roof, as shown at the right side of FIG. 5, in the direction of the arrow 16 laterally along the first guide track 13, the guide bolt 17 in the first phase of movement moves slightly in the opposite direction.

But then, after a short movement in the opposite direction, the movement of the guide bolt is reversed and it then moves in the same direction as the slide member 12 as indicated by the arrow 16.

The slide member 12 and, together therewith, the double-link joint 7 and the front roof part 2 are preferably operated by a motorized drive M which engages the slide member 12 and moves the slide member in the first guide track 13 for example by a spindle disposed in the guide track 13. The slide member includes a cantilever arm 21, which is longitudinally movably supported in guide groove 22 of the first guide track 13.

What is claimed is:

1. A hardtop vehicle roof which is movable between a closed position, in which it covers an interior vehicle space, and a storage position, in which the interior vehicle space is open, said hardtop vehicle roof including a front roof part and a rear roof part, a kinematic operating mechanism disposed between, and joining, said front and rear roof parts for controlled relative movement therebetween, and including a first guide track mounted on said rear roof part and supporting a slide member so as to be linearly movable therein, a doublelink joint including two levers each being pivotally connected to said slide member and with their free ends being pivotally connected to said front roof part and a second guide track provided on said rear roof part and guiding one of said levers during movement of said slide member along said first track for controlling the pivot position of said levers and, accordingly the position of said front roof part relative to said rear roof part.

2. A hardtop vehicle roof according to claim 1, wherein said second guide track includes a section extending parallel to said first guide track.

3. A hardtop vehicle roof according to claim 2, wherein said second guide track includes an end section, which is curved away from said first guide track.

4. A hardtop vehicle roof according to claim 3, wherein said curved-away section of said second guide track is disposed at the end thereof adjacent said front roof part.

5. A hardtop vehicle roof according to claim 4, wherein said curved-away section of said second guide track is so disposed that the guidance thereof of said one lever of said double link joint causes a lowering of the front roof part below the rear roof part when said slide member is moved out of its front end position adjacent the front roof part.

6. A hardtop vehicle roof according to claim 1, wherein a drive mechanism is connected to said slide member for moving said slide member along said first guide track.

7. A hardtop vehicle roof according to claim 1, wherein said one lever has a section extending beyond said slide member and carrying a guide bolt received in said second guide track.

8. A hardtop vehicle roof according to claim 1, in which said slide member is movably supported in a straight guide track.

9. A hardtop vehicle roof according to claim 1, wherein said rear vehicle roof part is supported on a vehicle body by a two-link joint capable of pivoting said rear roof part between said closing and said storage positions.

10. A hardtop vehicle roof according to claim 1, wherein said front roof part and said rear roof part are disposed in said storage space in an essentially upright position.

* * * * *